(12) United States Patent
Chuang et al.

(10) Patent No.: US 8,140,135 B2
(45) Date of Patent: Mar. 20, 2012

(54) HANDHELD ELECTRONIC DEVICE

(75) Inventors: Cheng-Chieh Chuang, Taoyuan County (TW); Yien-Chun Kuo, Taoyuan County (TW); Chih-Sheng Wei, Taoyuan County (TW); Yi-Shen Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 481 days.

(21) Appl. No.: 12/406,126

(22) Filed: Mar. 18, 2009

(65) Prior Publication Data

US 2010/0144408 A1    Jun. 10, 2010

(30) Foreign Application Priority Data

Dec. 5, 2008    (TW) .............................. 97147399 A

(51) Int. Cl.
*H04M 1/00* (2006.01)
*H04M 1/02* (2006.01)
(52) U.S. Cl. .................................. 455/575.4; 455/575.1
(58) Field of Classification Search ............... 455/575.1, 455/575.4, 566, 550.1, 90.3
See application file for complete search history.

(56) References Cited

U.S. PATENT DOCUMENTS

| 7,627,337 B2* | 12/2009 | Maatta et al. ............. 455/550.1 |
| 2007/0243896 A1 | 10/2007 | Maatta et al. |
| 2008/0311963 A1* | 12/2008 | Strawn ...................... 455/575.1 |

FOREIGN PATENT DOCUMENTS

| EP | 1796351 | 6/2007 |
| WO | 2006106374 | 10/2006 |

OTHER PUBLICATIONS

"Search report of Europe counterpart application", issued on Jul. 2, 2009, p. 1-p. 6.

* cited by examiner

*Primary Examiner* — Daniel D Chang
(74) *Attorney, Agent, or Firm* — Jianq Chyun IP Office

(57) ABSTRACT

A handheld electronic device including a first body, a second body, a sliding block and a linkage mechanism is provided. The first body is stacked on the second body. The sliding block is located between the first body and the second body, and is slidably coupled to the first body. The linkage mechanism is connected between the sliding block and the second body, by which while the first body and the second body are spread in a direction, the first body and the second body are approximately coplanar. Therefore, space in the device can be used efficiently. Besides, the device can be more miniaturized and operated more conveniently.

13 Claims, 8 Drawing Sheets

HANDHELD ELECTRONIC DEVICE

CROSS-REFERENCE TO RELATED APPLICATION

This application claims the priority benefit of Taiwan application serial no. 97147399, filed on Dec. 5, 2008. The entirety of the above-mentioned patent application is hereby incorporated by reference herein and made a part of specification.

BACKGROUND OF THE INVENTION

1. Field of the Invention

The present application relates to a handheld electronic device. More particularly, the present application relates to a sliding handheld electronic device.

2. Description of Related Art

With development of information technology, information is more easily obtained form electronic devices in daily life. On the other hand, as techniques for process engineering are improved, various handheld electronic devices have a development trend of lightness, slimness, shortness and smallness, and since the handheld electronic device are easy to be carried, it is generally accepted by people and utilized in people's daily life.

Taking a mobile phone as an example, to easily carry the mobile phone around and to match different preferences and requirements, besides conventional bar-type phones, the mobile phones can be generally classified into flip phones, twist phones and slide phones, etc. Regarding the slide phone, an upper body and lower body thereof are stacked and are slidable relative to one another, so as to achieve different operation modes such as open and close, etc. Stacking of the two bodies avails miniaturizing a whole size of the slide phone, and the upper and lower bodies can be spread under a specific operation mode. However, limited to a mechanism design, when the current slide phone is spread, a part of stacked regions is still existed between the upper and lower bodies, so that an area usage rate of the upper and lower bodies is decreased, which is of no avail to a further miniaturization of the slide phone.

On the other hand, when the upper and lower bodies of the slide phone are relatively slid, a certain height step is formed there between. The height step not only influences a whole appearance of the mobile phone, but also influences an operation convenience of a user. For example, to avoid an interference caused by the height step in use, a certain distance has to be kept between first row keys and the height step, so that maximization of a keyboard design cannot be achieved.

SUMMARY OF THE INVENTION

The present application is directed to a handheld electronic device having two stacked bodies, in which upper surfaces of the two bodies can be spread to be coplanar.

The present application provides a handheld electronic device including a first body, a second body, a sliding block and a linkage mechanism. The first body is stacked on the second body. The sliding block is located between the first body and the second body, and is slidably coupled to the first body. The linkage mechanism is connected between the sliding block and the second body to drive the sliding block moving relative to the second body, so that after the first body and the second body are spread along a direction, the first body and the second body are approximately coplanar.

According to the above description, different from a conventional design that a height step is formed when the two bodies of the sliding handheld electronic device are spread, in the present application, by using the sliding block and the linkage mechanism, the two bodies are spread to be coplanar. Therefore, not only the sliding handheld electronic device may have a levelled appearance under a spread state, but also an operation convenience of a user can be improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
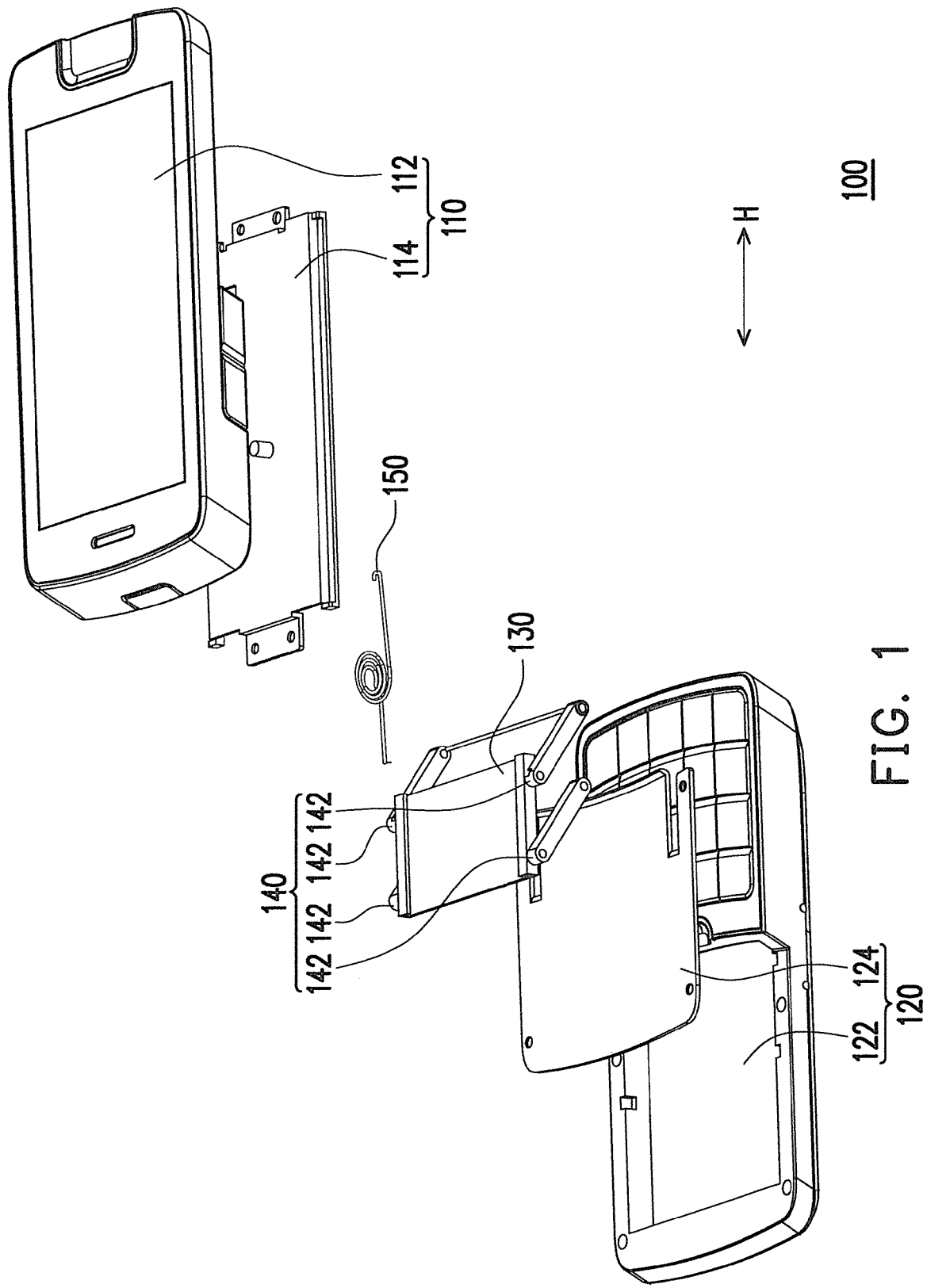
FIG. 1 is an explosion diagram illustrating a handheld electronic device according to an embodiment of the present invention.

In the following embodiments, detailed parts therein can be combined, substituted or omitted to cope with actual requirements. Those with ordinary skill in the art should understand the spirit and technique features of the present invention with reference of the following embodiments, and reasonable variations and applications can be made to the structure of the present invention without departing from the scope or spirit of the invention. Moreover, for simplicity's sake, and to make the descriptions comprehensive, like reference numerals refer to the like elements and repeated descriptions can be omitted.

FIG. 1 is an explosion diagram illustrating a handheld electronic device according to an embodiment of the present invention. Referring to FIG. 1, the handheld electronic device 100 includes a first body 110, a second body 120, a sliding block 130, a linkage mechanism 140 and a first elastic member 150. The first body 110 is stacked on the second body 120. The sliding block 130, the linkage mechanism 140 and the first elastic member 150 are disposed between the first body 110 and the second body 120, so that the first body 110 and the second body 120 can be relatively slid along a direction H to switch operation modes of spread state and close state.

In the present embodiment, the first body 110 includes a first main body 112 and a first plate 114. The first main body 112 is disposed on the first plate 114, and the first plate 114 is slidably coupled to the sliding block 130, so that the first main body 112 can be moved along the direction H relative to the second body 120 through the sliding block 130. Certainly, in the other embodiments of the present invention, the first plate 114 can also be omitted, so that the sliding block 130 is directly combined to the first main body 112. The second body 120 includes a second main body 122 and a second plate 124. The linkage mechanism 140 is connected between the sliding block 130 and the second main body 122. When the first body 110 and the second body 120 are spread along the direction H, the first body 110 is further moved relative to the second body 120 through the linkage mechanism 140, so that the first body 110 and the second body 120 can be coplanar (shown as FIG. 2E and FIG. 3D in the followings), and the first body 110 and the second body 120 are partially stacked.

In detail, the linkage mechanism 140 of the present embodiment is a parallel four-bar mechanism including four mutually parallel rods 142. Two ends of each of the rod 142 are pivotally connected to the sliding block 130 and the second main body 122, respectively. When the first body 110 and the second body 120 are spread along the direction H, the first body 110 is slid relative to the sliding block 130, and when the first body 110 and the sliding block 130 reach a limited position, the linkage mechanism 142 is rotated while taking a pivot between the rod 142 and the second main body 122 as a shaft, and accordingly drives the sliding block 130 moving relative to the second main body 122, so that the first body 110 and the second body 120 are coplanar after being spread.

FIGS. 2A-2E are diagrams sequentially illustrating an operation process of the handheld electronic device 100 from a close state to a spread state.

Figure 2A:
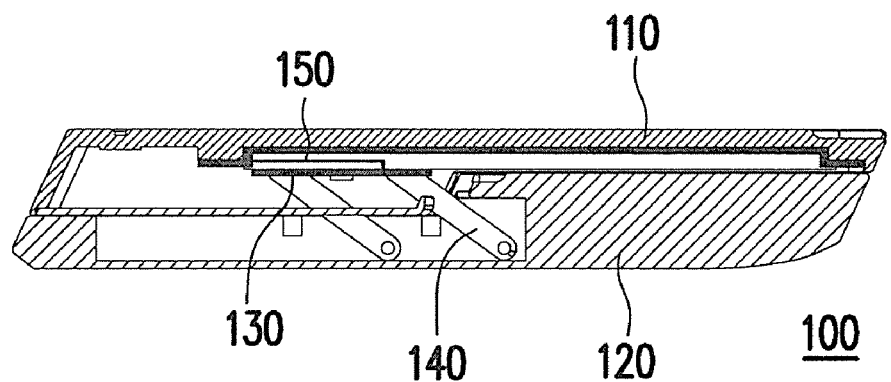
FIGS. 2A-2E are diagrams illustrating a spread process of a handheld electronic device according to the embodiment of the present invention.

First, FIG. 2A is a schematic diagram illustrating the handheld electronic device in the close state. The first elastic member 150 is disposed between the first body 110 and the sliding block 130 for providing energy to move the first body 110 during a spread or a close process of the handheld electronic device 100. In other words, the handheld electronic device 100 has a semi-auto sliding function. The opposite sides of the first body 110 and the second body 120 respectively have a mutually-matched concave, so that when the handheld electronic device 100 is in a totally close state, the first body 110 and the second body 120 can be mutually stacked and may have an integral appearance. Now, the sliding block 130, the linkage mechanism 140 and the first elastic member 150 are in an initial state. In the present embodiment, the first elastic member 150 can be a torsion spring, a coil spring or other elastic members that can achieve the semi-auto sliding. In the present embodiment, the first elastic member 150 is a pair of torsion spring.

Figure 2B:
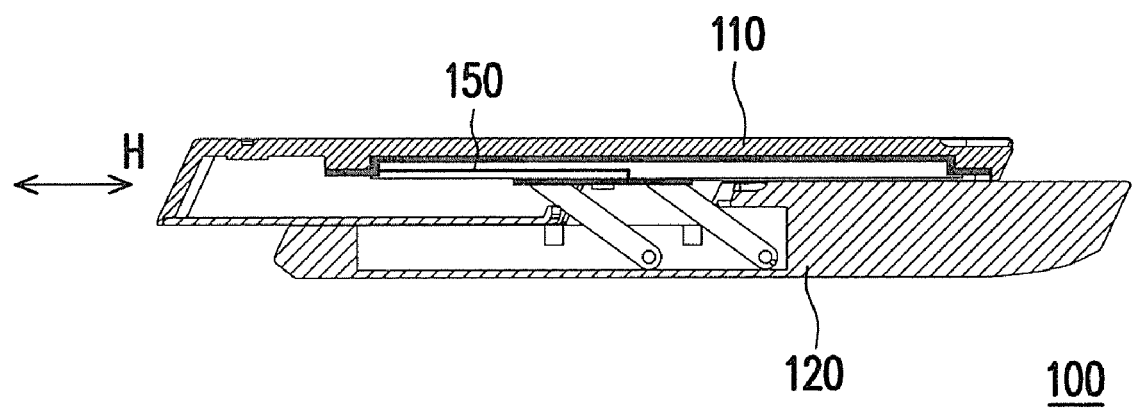

Next, as shown in FIG. 2B, when a user pushes the first body 110, the first body 110 is slid relative to the second body 120 along the direction H, and the first elastic member 150 starts to store an elastic potential energy.

Figure 2C:
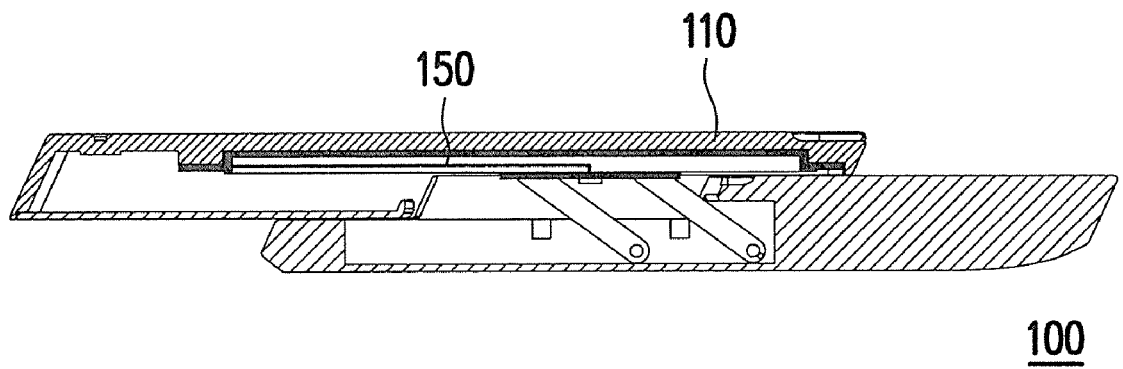

Next, as shown in FIG. 2C, when the first body 110 is moved and reaches a threshold position, the first elastic member 150 releases the stored elastic potential energy and automatically drives the first body 110 towards a force-applying direction of the user.

Figure 2D:
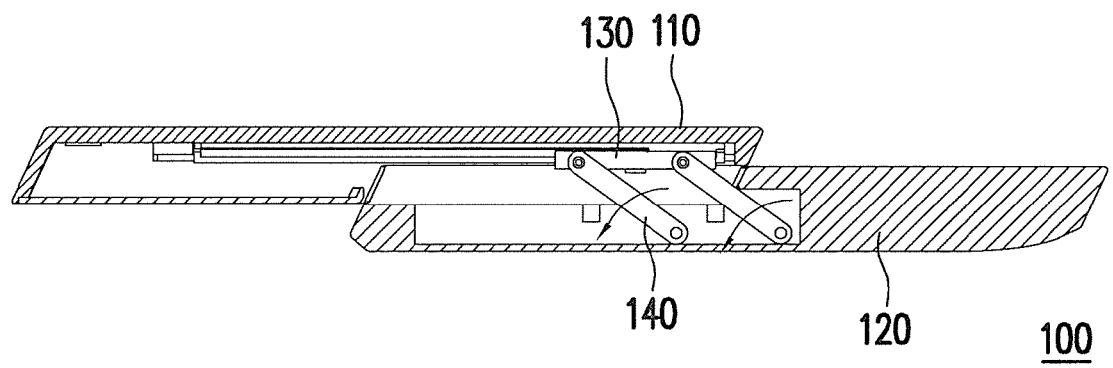

Meanwhile, as shown in FIG. 2D, when the first body 110 is slid to a limited position relative to the sliding block 130, the linkage mechanism 140 is rotated and drives the sliding block 130, so that the first body 110 is moved into a lower place of the concave on the second body 120.

Figure 2E:
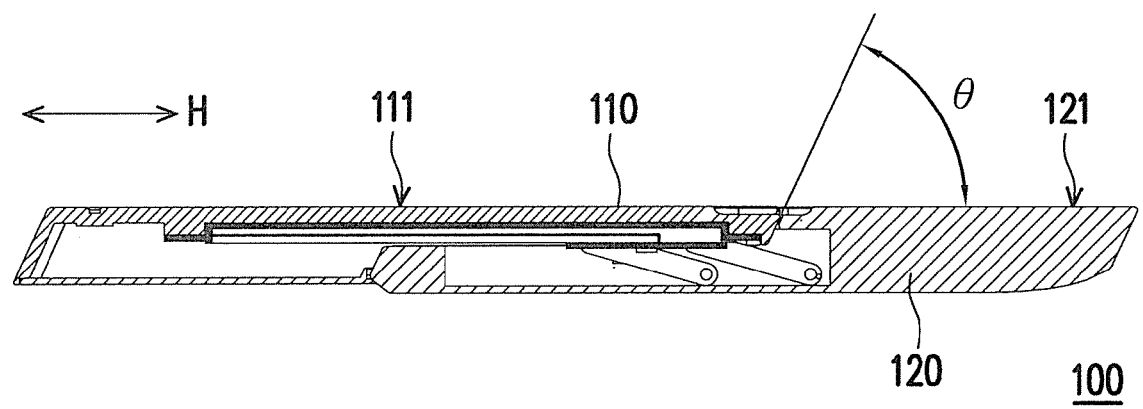

Finally, as shown in FIG. 2E, the handheld electronic device 100 is totally spread, and the first body 110 enters the lower place of the concave of the second body 120. Now, a first upper plane 111 of the first body 110 and a second upper plane 121 of the second body 120 are in a coplanar state.

On the other hand, when the user wants to close the handheld electronic device 100, the steps shown in FIGS. 2A-2E are reversely performed to switch the handheld electronic device 100 from the spread state of FIG. 2E to the close state of FIG. 2A. It should be noted that to smooth and facilitate the user pushing the first body 110 relative to the second body 120 along the direction H, a side edge where the first body 110 leans against the second body 120 in the concave has a tilt angle. Considering an easy slide during the close operation, the appearance and the operation convenience of the handheld electronic device 100, the tilt angle is, for example, between 55 degrees to 75 degrees. Preferably, the tilt angle is, for example, 65 degrees. When the first body 110 is pushed, the linkage mechanism 140 drives the block 130, so that the first body 110 is rotated relative to the second body 120. When a bottom surface of the first body 110 is higher than the concave of the second body 120, the first body 110 is slid relative to the sliding block 130. Now, the first elastic member 150 stores an elastic potential energy. When the user pushes the first body 110 to the threshold position, the first elastic member 150 releases the stored elastic potential energy to accomplish the remained operation process, so that the first body 110 and the second body 120 are recovered to a stacked state shown as FIG. 2A. Therefore, the handheld electronic device 100 can provide the semi-auto sliding function.

Though a pair of torsion spring is applied to serve as the first elastic member 150, actually, in the other embodiments of the present invention, other types of the spring such as a coil spring or other types of the elastic member can also be applied to achieve the semi-auto sliding function. Moreover, in the present embodiment, a positioning mechanism such as a magnet, a latch mechanism or a hook, etc. (which are described later) can also be applied to limit relative positions of the first body 110 and the second body 120 under the spread state. By such means, the handheld electronic device 100 is changed to a bar-type handheld electronic device, so that the user can directly perform a phone call, input data or watch multimedia information, etc. through the spread state handheld electronic device.

Figure 3A:
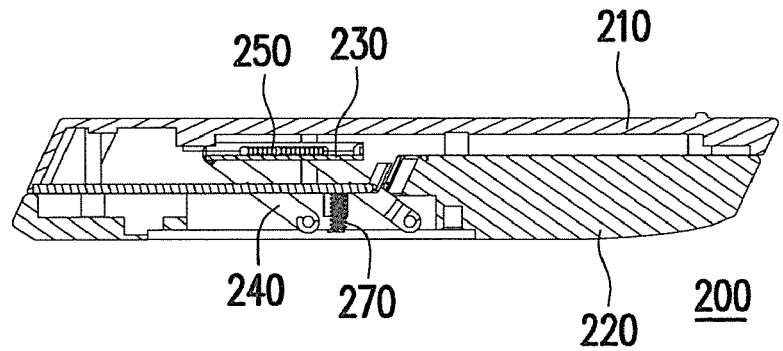
FIGS. 3A-3G are diagrams illustrating a spread and a close process of a handheld electronic device according to another embodiment of the present invention.
Figure 3B:
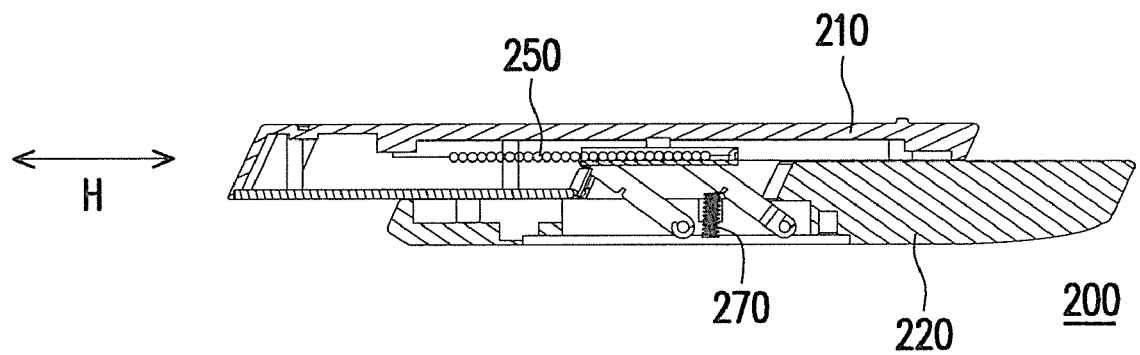
Figure 3C:
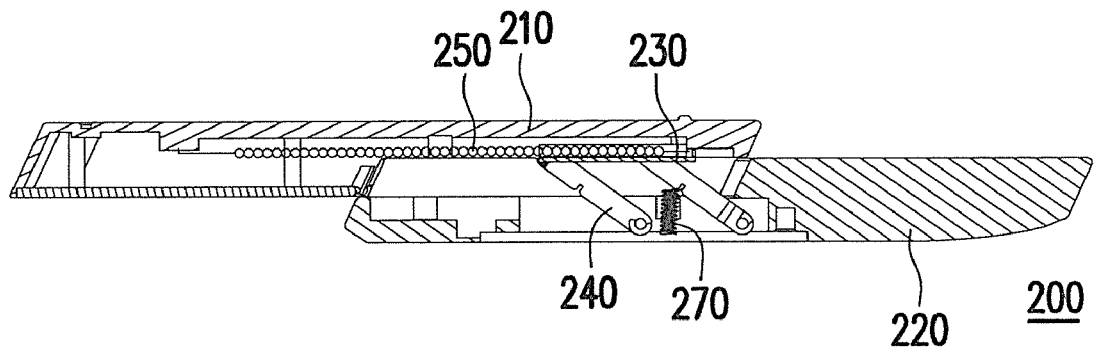
Figure 3D:
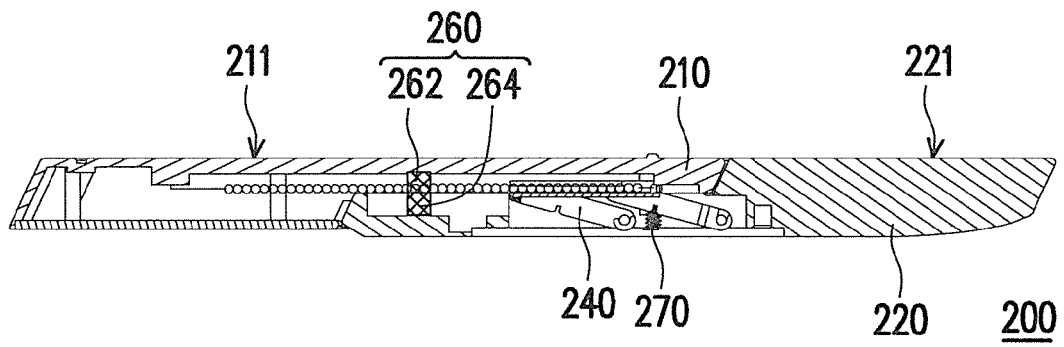
Figure 3E:
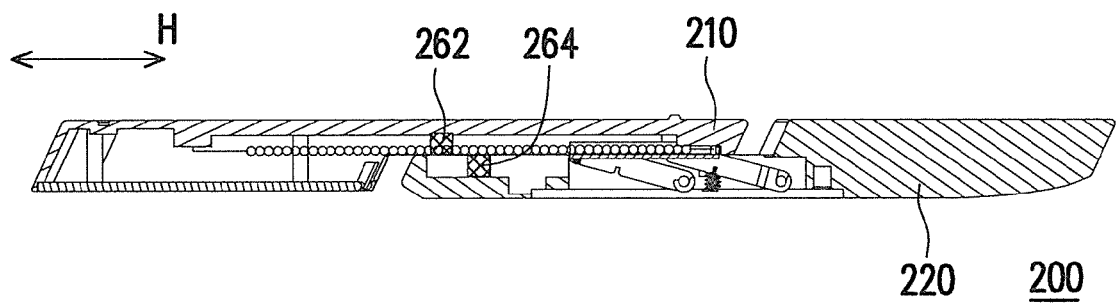
Figure 3F:
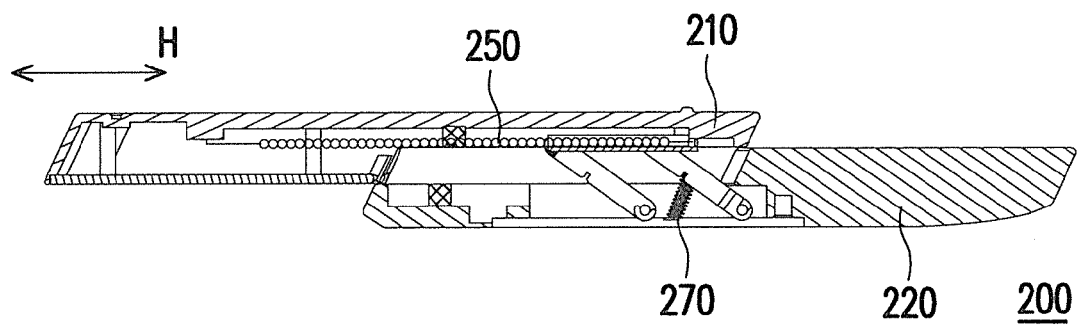
Figure 3G:
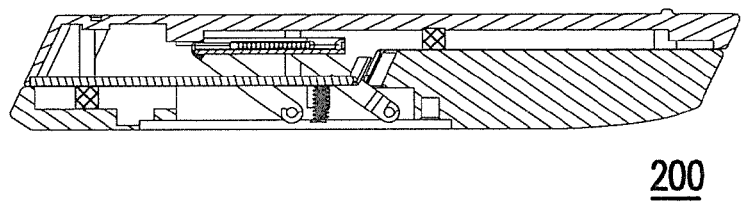

FIGS. 3A-3D are diagrams illustrating an operation process of a handheld electronic device from a close state to a spread state according to another embodiment of the present invention, and FIGS. 3E-3G are diagrams illustrating an operation process of the handheld electronic device from the spread state to the close state. Compared to the aforementioned embodiment, a second elastic member 270 is further configured between a second body 220 and a linkage mechanism 240 to provide energy required for rotating the linkage mechanism 142 during the spread and the close process of the handheld electronic device 200. Moreover, in the present embodiment, a positioning mechanism 260 is further disposed between a first body 210 and the second body 220 to limit the relative positions of the first body 210 and the second body 220 after the first body 210 and the second body 220 are spread. In other words, due to the positioning mechanism 260, the linkage mechanism 240 cannot be self-rotated to elevate the first body 210. For example, when the user uses the first body 210 and the second body 220 in the spread state to perform the phone call, and if the first body 210 is touched to the user's ear, a relative movement between the first body 210 and the second body 220 is prevented. By such means, the handheld electronic device 200 is changed to a bar-type handheld electronic device, and the user can directly perform the phone call, input data or watch multimedia information, etc. through the spread state handheld electronic device.

In detail, the positioning mechanism 260 for example includes a first magnetic member 262 and a second magnetic member 264. The first magnetic member 262 is disposed on the first body 210, and the second magnetic member 264 is disposed on the second body 220. The first magnetic member 262 and the second magnetic member 264 are mutually magnetic attracted after the first body 210 and the second body 220 are spread, so as to limit the relative positions of the first body 210 and the second body 220. However, the positioning mechanism 260 can also be substituted by mechanisms such as the latch mechanism, the hook, etc., so as to limit the relative positions of the first body 210 and the second body 220 under the spread state. A detailed operation flow of the handheld electronic device 200 is as follows.

First, FIG. 3A is a schematic diagram illustrating the handheld electronic device 200 in the close state. A first elastic member 250 is configured between the first body 210 and a sliding block 230 for providing energy to move the first body 210 during the close process of the handheld electronic device 200. In the present embodiment, the first elastic member 250 is a coil spring. The opposite sides of the first body 210 and the second body 220 respectively have a mutually-matched concave, so that when the handheld electronic device 200 is in a totally close state, the first body 210 and the second body 220 can be mutually stacked and may have an integral appearance. Now, the sliding block 230, the linkage mechanism 240 and the first elastic member 250 are in the initial state.

Next, as shown in FIG. 3B, when the user pushes the first body 210, the first body 210 is slid relative to the second body 220 along the direction H, and the first elastic member 250 is drove by the first body 210 and is extended to store an elastic potential energy.

Next, as shown in FIG. 3C, when the first body 210 is slid to a limited position relative to the sliding block 230, the linkage mechanism 240 drives the block 230, so that the first body 210 is moved into a lower place of the concave on the second body 220.

Finally, as shown in FIG. 3D, the first body 210 enters the lower place of the concave of the second body 220, and now a first upper plane 211 and a second upper plane 221 are in the coplanar state. The handheld electronic device 200 may include the positioning mechanism 260 to fix the relative positions of the first body 210 and the second body 220. As described above, due to the positioning mechanism 260, the linkage mechanism 240 cannot be self-rotated to elevate the first body 210. For example, when the user uses the first body 210 and the second body 220 in the spread state to perform the phone call, and if the first body 210 is touched to the user's ear, a relative movement between the first body 210 and the second body 220 is prevented.

In the present embodiment, the positioning mechanism 260 includes the first magnetic member 262 and the second magnetic member 264 respectively disposed in the first body 210 and the second body 220. The first magnetic member 262 and the second magnetic member 264 are mutually magnetic attracted to fix the relative positions of the first body 210 and the second body 220. However, the positioning mechanism 260 can also be substituted by mechanisms such as the latch mechanism, the hook, etc., so as to limit the relative positions of the first body 210 and the second body 220 under the spread state of the handheld electronic device. Meanwhile, the second elastic member 270 is configured between the linkage mechanism 240 and the second body 220. After the first body enters the lower place of the concave of the second body 220, the second elastic member 270 is compressed to store an elastic potential energy.

FIGS. 3E-3G are diagrams illustrating an operation process of the handheld electronic device 200 from the spread state to the close state.

As shown in FIG. 3E, during the close process of the handheld electronic device 200 of the present embodiment, the user spreads the first body 210 and the second body 220 along the direction H to stagger the relative positions of the first magnetic member 262 and the second magnetic member 264, so as to release a position-limiting effect of the first magnetic member 262 and the second magnetic member 264 to the first body 210 and the second body 220. If the positioning mechanism 260 is the latch mechanism, or the hook, etc., the position-limiting effect of the latch mechanism or the hook can also be released when the user spreads the first body 210 and the second body 220 along the direction H. Meanwhile, it should be noted that the side edge where the first body 210 leans against the second body 120 in the concave doesn't have any limitations due to the first body 210 can be put out. In other words, the tilt angle as described in the previous embodiment is not limited between 55 degrees to 75 degrees, and the side edge of the first body 210 can be any shape since the first body 210 can be put out.

As shown in FIG. 3F, when the user releases the first body 210, the second elastic member 270 releases the stored elastic potential energy to rotate the linkage mechanism 240, so that the bottom surface of the first body 210 is higher than the second body 220. Now, the stored elastic potential energy released by the first elastic member 250 drives the first body 210 to move along the direction H, so as to achieve the close state of the handheld electronic device 200 shown in FIG. 3G.

Figure 4:
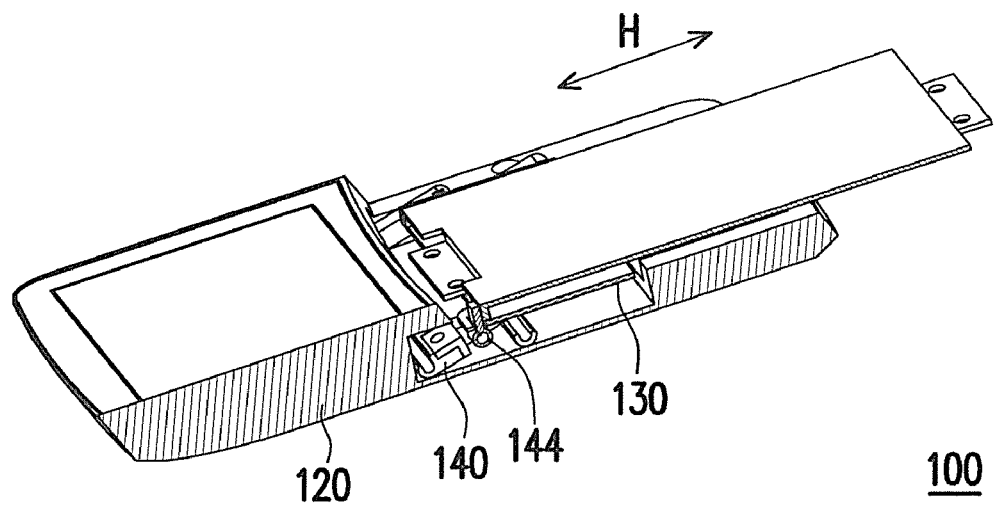
FIG. 4 is a schematic diagram illustrating a handheld electronic device applying a lock mechanism of the present application.

Moreover, as shown in FIG. 4, during the close process, when the first body 110 contacts the second body 120, it may not be easy to elevate the first body 110 to be higher than the second body 120 to achieve the close state. Therefore, to smoothly achieve the close state of the first body 110 and the second body 120, the handheld electronic device 100 may include a lock mechanism 144 disposed on the linkage mechanism 140. During the close process, when the first body 110 touches the lock mechanism 144, the lock mechanism 144 can drive a rotation of the linkage mechanism 140 to elevate the sliding block 130, so that a position of the sliding block 130 can be higher than that of the lock mechanism 144. Then, the first body 110 is moved along the direction H and passes over the lock mechanism to achieve the close state.

Figure 5A:
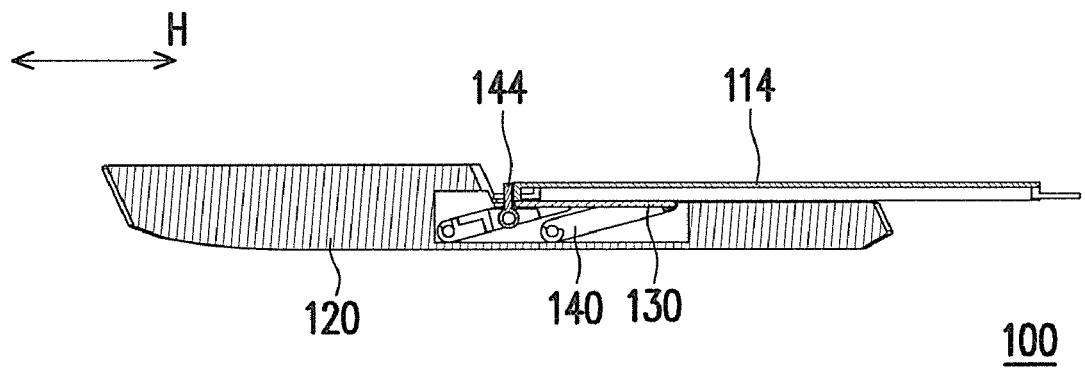
FIG. 5A and FIG. 5B are schematic diagrams illustrating operations of a lock mechanism of FIG. 4.
Figure 5B:
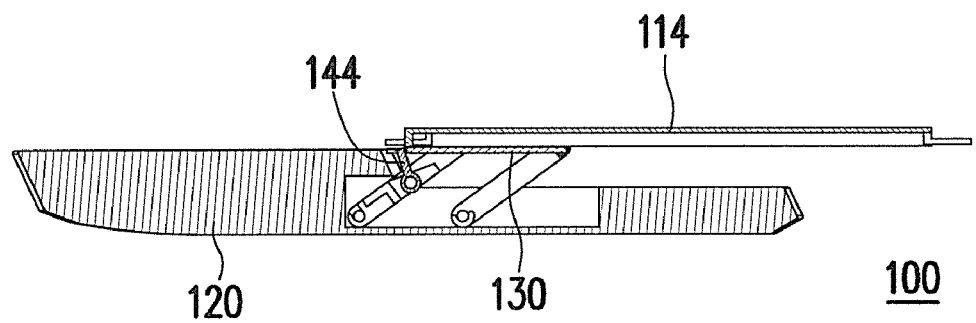

FIG. 5A and FIG. 5B are schematic diagrams illustrating operations of the lock mechanism 144. When the handheld electronic device 100 is about to be closed, the user pushes the first body 110 to move along the direction H. Next, as shown in FIG. 5B, when the firs body 110 pushes the lock mechanism 144 to rotate the linkage mechanism 140, the position of the sliding block 130 is higher that of the lock mechanism 144. Now, the first body 110 can be moved by the elastic potential energy stored in the first elastic member 150, so as to achieve the close state of the first body 110 and the second body 120.

Figure 6:
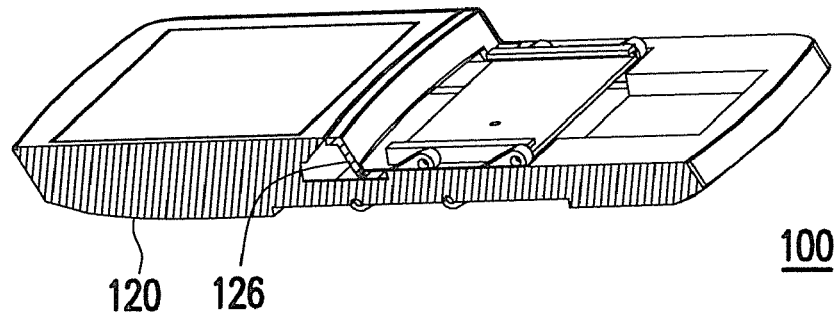
FIG. 6 is a schematic diagram illustrating a handheld electronic device applying a rotatable member of the present application.

Moreover, as shown in FIG. 6, as described above, to resolve a problem of un-smooth sliding between the first body 110 and the second body 120 caused by interference between the first body 110 and the second body 120 during the close process, a rotatable member 126 is further configured between the first body 110 and the second body 120. To clearly illustrate a design of the rotatable member, the first body 110 is omitted in FIG. 6.

Figure 7A:
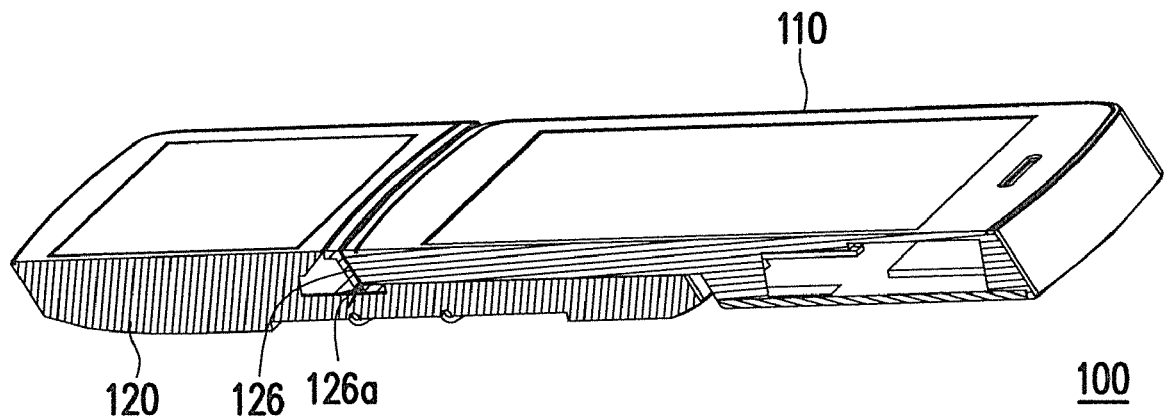
FIG. 7A and FIG. 7B are schematic diagrams illustrating operations of a rotatable member of FIG. 6.
Figure 7B:
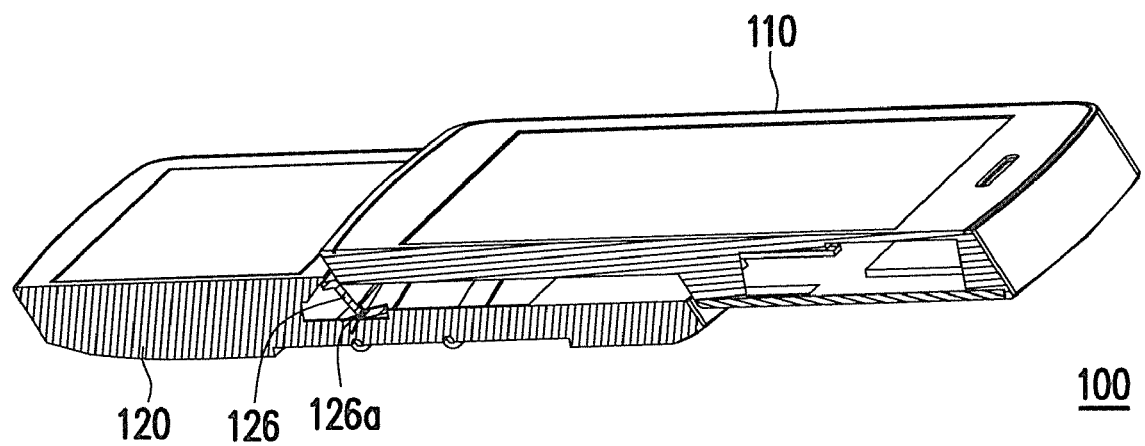

FIG. 7A and FIG. 7B are diagrams illustrating operations of the rotatable member. As shown in FIG. 7A, after the handheld electronic device 100 is spread, a short edge of the first body 110 is leaned against the rotatable member 126, and the rotatable member 126 is pivotally disposed on the second body 120 along a rotation shaft 126a. As shown in FIG. 7B, during the close process of the handheld electronic device 100, the rotatable member 126 rotates along the rotation shaft 126a, so that the first body 110 can smoothly overpass the concave of the second body 120, so as to avoid the interference between the first body 110 and the second body 120 that influences an operation feeling of the user.

It should be noted that the rotatable member 126, the lock mechanism 144, the second elastic member 270 and the positioning mechanism 260 are not limited to the aforementioned embodiments, and combinations and variations of the devices can be made within reasonable range and design, so as to match actual requirements. For example, the positioning mechanism 260 can be used for fixing the relative positions of the first body 110 and the second body 120, and application of the lock mechanism 144, the rotatable member 126 and the second elastic member 270 can smooth the close process of the first body 110.

Figure 8:
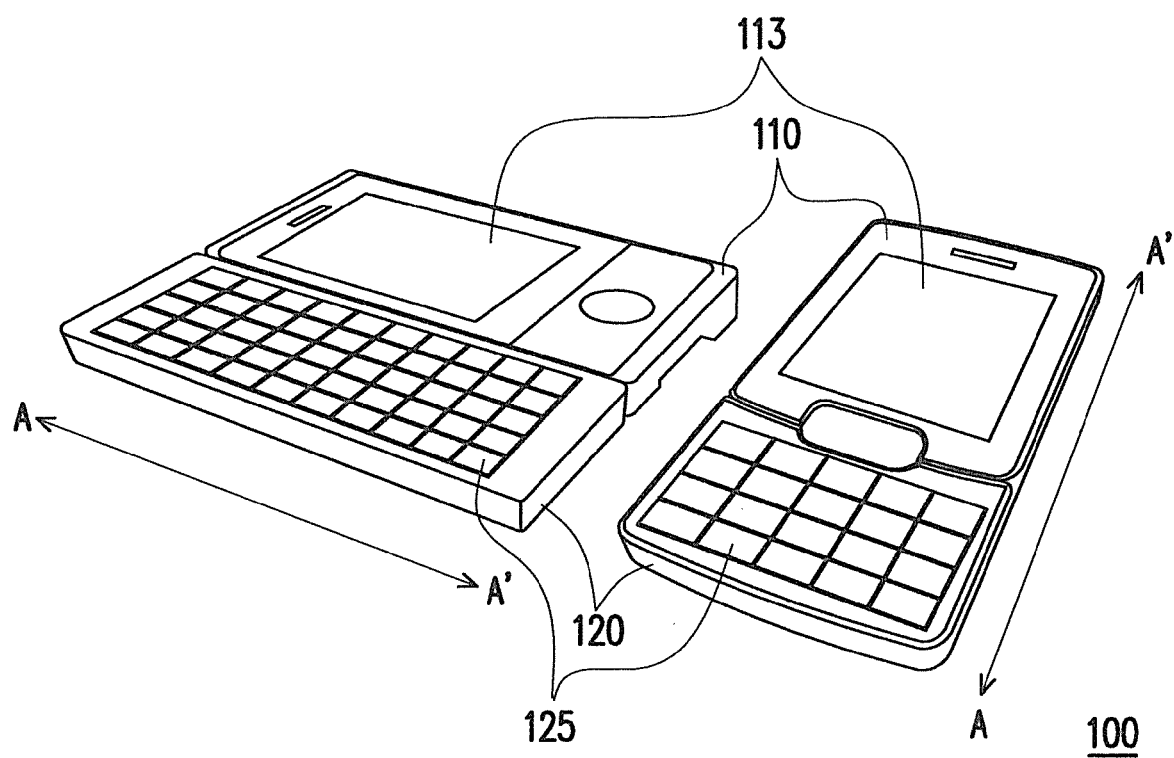
FIG. 8 is a schematic diagram illustrating a spread vertical sliding handheld electronic device and a spread lateral sliding handheld electronic device of the present application.

As shown in FIG. 8, the relative movement direction of the first body 110 and the second body 120 is not limited to be along the direction of a long-axis A-A' of the handheld electronic device. To match other applications, the relative movement direction of the first body 110 and the second body 120 can be changed to be perpendicular to the direction of the long-axis A-A' of the handheld electronic device, so that the present invention can not only be applied to vertical sliding handheld electronic devices, but can also be applied to lateral sliding handheld electronic devices. In detail, the first body 110 has a first display interface 113, and the first display interface 113 can be a display or a touch screen. The second body 120 has an input interface 125, and the input interface 125 can be a keyboard, a touch keyboard or a touch screen.

Figure 9:
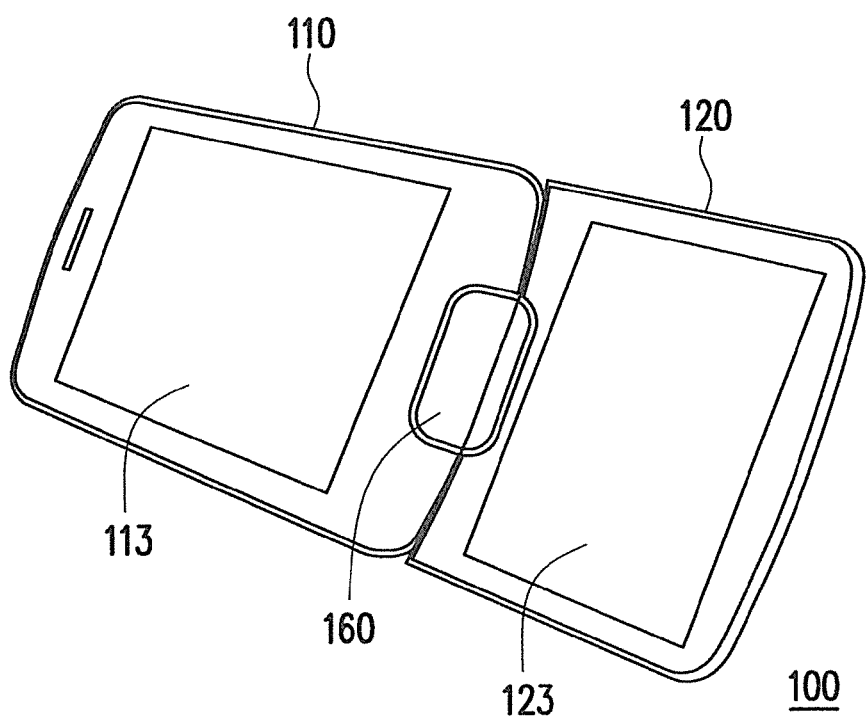
FIG. 9 is a schematic diagram illustrating a dual-screen sliding handheld electronic device of the present application.

Moreover, as shown in FIG. 9, the first body 110 has the first display interface 113, and the second body 120 has a second display interface 123, wherein the first display interface 113 can be a display or a touch screen, and the second display interface 123 can be a touch screen. In addition, when the first body 110 and the second body 120 are in the spread state, a control key 160 can be formed there between. In other words, the first body 110 and the second body 120 respectively comprise a part of the control key. Similarly, a touch screen can be formed between the first body 110 and the second body 120. Therefore, patterns of the first body 110 and the second body 120 are not limited to the aforementioned descriptions, and combinations and variations thereof can be made within reasonable range, so as to match the actual requirements. For example, the first body 110 or the second body 120 can respectively comprise the display interface and the input interface, or a touch panel can be applied to simultaneously provide a display function and an information input function.

In summary, in the present invention, the sliding block and linkage mechanism are applied to meliorate a conventional sliding handheld electronic device having a concave in the spread state. According to the present application, the first and the second bodies are meliorated to be coplanar after being spread, and are partially stacked to contain the sliding block and the linkage mechanism, so as to improve a usage area of the sliding handheld electronic device. Besides, the present invention can further be applied to the vertical sliding handheld electronic devices and the lateral sliding handheld electronic device. Moreover, in design of the sliding handheld electronic device, the elastic member, the positioning mechanism, the lock mechanism and the rotatable member, etc. can be applied to improve a design flexibility, so as to match different design requirements. For example, the first body may include the display interface, and the second body may include the keyboard. Alternatively, the first body and the second body man all include the touch screen, so that the first display interface 113 and the second display interface 123 may have an interactive function. Moreover, application of the present invention is not limited to the vertical sliding handheld electronic devices, but is also adapted to the lateral sliding handheld electronic devices, so that the application and usage convenience of the present invention can be expended.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
    a first body;
    a second body, wherein the first body is stacked on the second body, wherein a side of the second body facing the first body has a step;
    a sliding block, located between the first body and the second body, and slidably coupled to the first body;
    a linkage mechanism, connected between the sliding block and the second body to drive the sliding block moving relative to the second body; and
    a first elastic member, disposed between the first body and the sliding block,
    wherein for receiving a spread state of the handheld electronic device, the first body and the second body are adapted to spread along a direction, the first body is adapted to enter a lower place of the step, such that a top surface of the first body and a top surface of the second body are approximately coplanar, and the first elastic member is adapted to store an elastic energy,
    and for receiving a closed state of the handheld electronic device, the first body and the second body are adapted to spread along the same direction for a further distance, wherein the first elastic member releases the stored elastic energy for retracting the first body and the second body.

2. The handheld electronic device as claimed in claim 1, wherein the linkage mechanism is a parallel four-bar mechanism comprising four parallel rod, and two ends of each rod are pivotally connected to the sliding block and the second body, respectively.

3. The handheld electronic device as claimed in claim 1, wherein the first elastic member comprises a torsion spring or a coil spring.

4. The handheld electronic device as claimed in claim 1, further comprising a positioning mechanism disposed between the first body and the second body, and is used for limiting relative positions of the first body and the second body after the first body and the second body are spread.

5. The handheld electronic device as claimed in claim 4, wherein the positioning mechanism comprises a first magnetic member and a second magnetic member respectively disposed on the first body and the second body, wherein the first magnetic member and the second magnetic member are mutually magnetic attracted after the first body and the second body are spread.

6. The handheld electronic device as claimed in claim 1, further comprising a second elastic member disposed between the linkage mechanism and the second body.

7. The handheld electronic device as claimed in claim 1 further comprising a lock mechanism disposed on the linkage mechanism, and the lock mechanism leaning against the first body after the first body and the second body are spread.

8. The handheld electronic device as claimed in claim 1 further comprising a rotatable member disposed at a junction of the first body and the second body, wherein the rotatable member is pivotally disposed on the second body and leans against the first body, and is rotated along with a relative movement of the first body and the second body.

9. The handheld electronic device as claimed in claim 1, wherein the first body and the second body respectively have a long-axis direction, and the long-axis directions of the first body and the second body are respectively parallel to the direction.

10. The handheld electronic device as claimed in claim 1, wherein the first body and the second body respectively have a long-axis direction, and the long-axis directions of the first body and the second body are respectively perpendicular to the direction.

11. The handheld electronic device as claimed in claim 1, wherein a side of the first body departing from the sliding block has a first display interface.

12. The handheld electronic device as claimed in claim 11, wherein a side of the second body facing the sliding block has an input interface, and the input interface is exposed when the first body and the second body are spread.

13. The handheld electronic device as claimed in claim 11, wherein a side of the second body facing the sliding block has a second display interface, and the second display interface is exposed when the first body and the second body are spread.

\* \* \* \* \*